United States Patent
Rong (10) Patent No.: US 7,840,098 B2
(45) Date of Patent: Nov. 23, 2010

(54) VARIABLE OPTICAL POWER LIMITER

(75) Inventor: Haisheng Rong, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/039,985

(22) Filed: Jan. 20, 2005

(65) Prior Publication Data

US 2006/0159382 A1 Jul. 20, 2006

(51) Int. Cl.
*G02F 1/01* (2006.01)
*G02B 6/10* (2006.01)

(52) U.S. Cl. .............................. 385/1; 385/131; 385/129

(58) Field of Classification Search ....................... 385/1, 385/131, 129
See application file for complete search history.

(56) References Cited

U.S. PATENT DOCUMENTS

| | | | |
|---|---|---|---|
| 3,899,430 | A | 8/1975 | Ancker-Johnson |
| 6,993,236 | B1 * | 1/2006 | Gunn et al. ................. 385/131 |
| 7,085,443 | B1 * | 8/2006 | Gunn et al. ................... 385/14 |
| 7,089,001 | B2 | 8/2006 | Leung et al. |
| 7,239,877 | B2 | 7/2007 | Corneille et al. |
| 2001/0044731 | A1 | 11/2001 | Coffman et al. |
| 2003/0043975 | A1 | 3/2003 | Bhogal et al. |
| 2003/0053785 | A1* | 3/2003 | Ho .............................. 385/129 |
| 2003/0184758 | A1* | 10/2003 | Bjarklev et al. ............. 356/479 |
| 2004/0160658 | A1 | 8/2004 | Liu |
| 2004/0203942 | A1 | 10/2004 | Dehlin |

FOREIGN PATENT DOCUMENTS

| | | |
|---|---|---|
| EP | 0 565 993 A1 | 10/1993 |
| GB | 2 376 082 A | 12/2002 |
| JP | 5-346560 | 12/1993 |
| TW | 222219 | 10/2004 |
| TW | 226192 | 1/2005 |

OTHER PUBLICATIONS

C.R Nave, Hyperphysics, 2005, Georgia State University Online Link: http://hyperphysics.phy-astr.gsu.edu/Hbase/solids/intrin. html.*
Chivukula, Srinivas, "Silicon Nanocrystals: Amping Up The Light," Silicon Optoelectronics, Columbia Science Review, vol. 3, Issue 2, Fall 2006, pp. 6-7.

(Continued)

*Primary Examiner*—Uyen-Chau N Le
*Assistant Examiner*—Hoang Tran
(74) *Attorney, Agent, or Firm*—Blakely, Sokoloff, Taylor & Zafman LLP (57) ABSTRACT

A variable optical power limiter is disclosed. An apparatus according to aspects of the present invention includes an optical waveguide disposed in semiconductor material. An optical beam is to be directed through the optical waveguide. The optical beam is to generate free carriers in the optical waveguide via two-photon absorption in response to an input power level of the optical beam. A diode structure is disposed in the optical waveguide. The diode structure is coupled to be biased to control free carrier lifetimes of the free carriers in the optical waveguide to set an output power of the optical beam to a clamped output power level in response to the bias of the diode structure.

13 Claims, 5 Drawing Sheets

OTHER PUBLICATIONS

PCT/IT2006/000682—International Preliminary Report on Patentability and Written Opinion, dated Mar. 31, 2009.

Office Action mailed date Aug. 8, 2007, U.S. Appl. No. 11/090,384, filed Mar. 25, 2005.

Office Action mailed date Apr. 24, 2008, U.S. Appl. No. 11/090,384, filed Mar. 25, 2005.

Simpson, Alan, "Windows XP Bible," 2001, Hungry Minds, pp. 9-11, 23, 74, 113, 235, 438, 445, 462, 487, and 488.

PCT/US2006/000682—International Preliminary Report on Patentability and Written Opinion, dated Jul. 24, 2007.

Fischer, George L. et al., "Nonlinear-optical Christiansen filter as an optical power limiter," Optics Letters, vol. 21, No. 20, Oct. 15, 1996, pp. 1643-1645.

Sun, Wenfang et al., "Optical limiting performances of asymmetric pentaazadentate porphyrin-like cadmium complexes," Applied Physics Letters, vol. 73, No. 9, Aug. 31, 1998, pp. 1167-1169.

Guo, Junpeng et al., "Light-controlled electro-optic power limiter with a $Bi_{12}SiO_{20}$ crystal," Optics Letters, vol. 24, No. 14, Jul. 15, 1999, pp. 981-983.

"Optical Power Limiter: Series 86580," KiloLambda IP Limited, Mar. 2004.

PCT/US2006/000682, May 16, 2006, International Search Report.

* cited by examiner

VARIABLE OPTICAL POWER LIMITER

BACKGROUND OF THE INVENTION

1. Field of the Invention

Embodiments of invention relate generally to optical devices and, more specifically but not exclusively relate to limiting power in an optical beam.

2. Background Information

An optical power limiter is a device that can limit the intensity of light transmitted by the device to some value. Optical limiters can be useful for a number of purposes including protecting human eyes or sensors from high intensity light. Known optical power limiters include solid-state optical power limiters based on photoconductivity and the electro-optic effect has been observed in electro-optic crystals. Other known materials used for optical power limiting include molecular materials such as matallophthalocyanines and metallonaphthalocyanines, which exhibit relatively low linear absorption and high ratios of exited-state to ground-state absorption. Christiansen filters have also been utilized in optical power limiter applications to limit the maximum power transmitted by a device to some fixed value. Christiansen filters include for example small grains of crushed glass mixed with a liquid exhibiting a precise linear refractive index such that the glass grains disappear into the host liquid. An index mismatch between the liquid and glass components is induced by exposure to high intensity light, which therefore results in the optical power limiter behavior in the device. Use of the known optical power limiters such as those summarized above has been limited due to their complexity and the challenges involved with integrating and combining these technologies with other optical technologies into practical solutions.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for variably limiting the optical power of an optical signal are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

Figure 1:
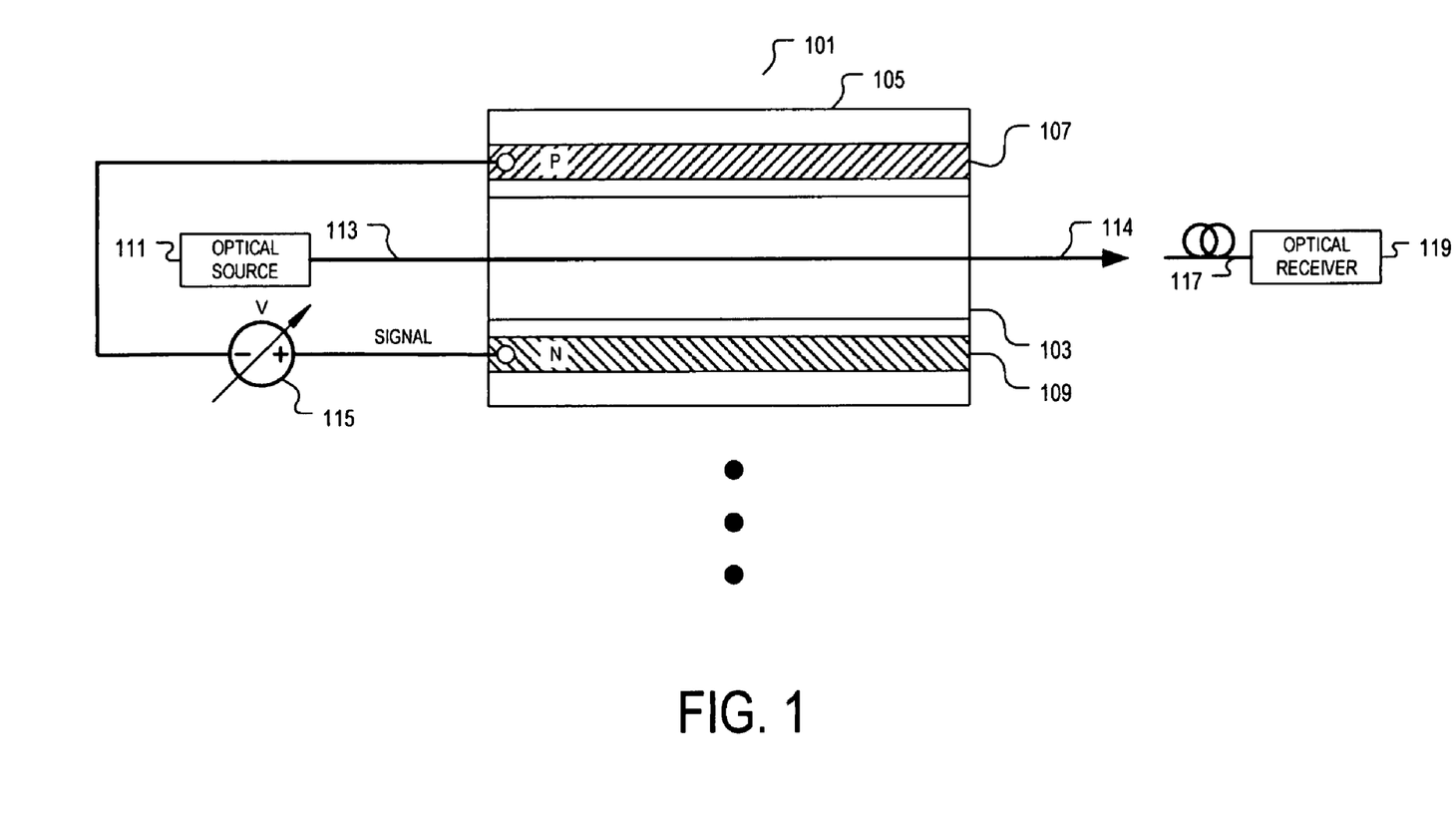
FIG. 1 is a block diagram illustrating one embodiment of a system including one embodiment of a variable optical power limiter in accordance with the teachings of the present invention.

FIG. 1 is a block diagram illustrating generally one embodiment of a system including one embodiment of a variable optical power limiter 101 in accordance with the teachings of the present invention. As shown in FIG. 1, optical power limiter 101 includes optical waveguide 103 disposed in semiconductor material 105. An optical source 111 is optically coupled to optical waveguide 103 to direct an optical beam 113 through optical waveguide 103. As will be discussed, optical beam 113 generates free charge carriers in optical waveguide 103 while propagating through optical waveguide 103 via two-photon absorption in response to the input power level of optical beam 113.

In one embodiment, a diode structure including a P region 107 and an N region 109 is disposed along either side of the optical waveguide 103. In one embodiment, the diode structure is coupled to a variable voltage source 115 to be reverse biased to control the lifetime of the free carriers generated in the optical waveguide via two-photon absorption process. By controlling the free carrier lifetimes, the output power of the optical beam can be variably limited or clamped in accordance with the teachings of the present invention. The optical beam is shown as optical beam 114 in FIG. 1 when output from optical waveguide 103. In one embodiment, the power level of output optical beam 114 is clamped to an output power level in response to the bias of the diode by variable voltage source 115 in accordance with the teachings of the present invention.

As also shown in the depicted embodiment, system 101 also includes an optical receiver 119 optically coupled to receiver output optical beam 114 from optical waveguide. In one embodiment, output optical beam 114 is directed from optical waveguide 103 through optical fiber 117 to optical receiver 119. In one embodiment of system 101, optical power limiter 101 is one of a plurality of optical power limiters in system 101. In such an embodiment, a plurality of optical beams 113 are each directed into corresponding optical power limiters 101, such that output optical beams 114 are each directed to respective optical receivers 119 in accordance with the teachings of the present invention. In such an embodiment, the output power levels of the output optical beams are all equalized to the clamped output optical power levels in accordance with the teachings of the present invention. In such an embodiment, system 101 may be an optical communications system such as for example a dense wavelength-division multiplexing (DWDM) system where each of the plurality of optical beams 113 corresponds to a unique channel of the DWDM system.

Figure 2:
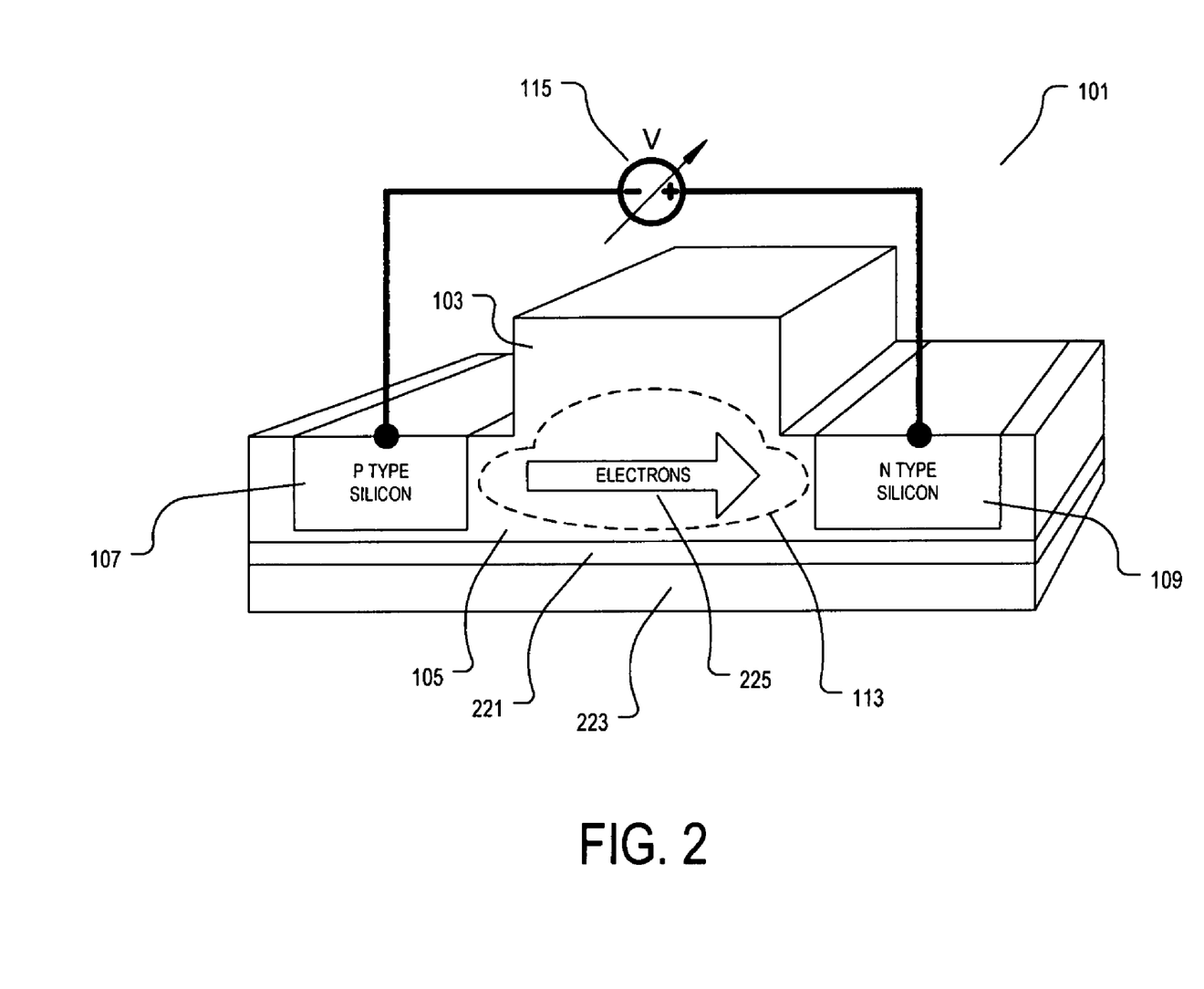
FIG. 2 is a cross section diagram of one embodiment of a rib optical waveguide included in a variable optical power limiter according to embodiments of the present invention.

FIG. 2 is a cross section diagram of one embodiment of optical waveguide 103 included in a variable optical power limiter 101 according to embodiments of the present invention. As illustrated in the embodiment depicted in FIG. 2, optical waveguide 103 is a rib waveguide including a rib region and a slab region. In the illustrated embodiment, optical beam 113 is shown propagating through the rib waveguide. As shown, the intensity distribution of the optical mode of optical beam 113 is such that the majority of the optical beam 113 propagates through a portion of the rib region of optical waveguide 103 towards the interior of the rib waveguide. In addition, a portion of optical beam 113 propagates through a portion of slab region towards the interior of the optical waveguide 103. As also shown with the optical mode of optical beam 113, the intensity of the propagating optical mode of optical beam 113 is vanishingly small at the "upper corners" of rib region as well as the "sides" of the slab region of optical waveguide 103. In the illustrated embodiment, optical waveguide 103 is formed in a silicon-on-insulator (SOI) wafer including the silicon of semiconductor material 105, a silicon layer 223 and a buried oxide layer 221 disposed between the substrate semiconductor material 105 and silicon layer 223.

Figure 3:
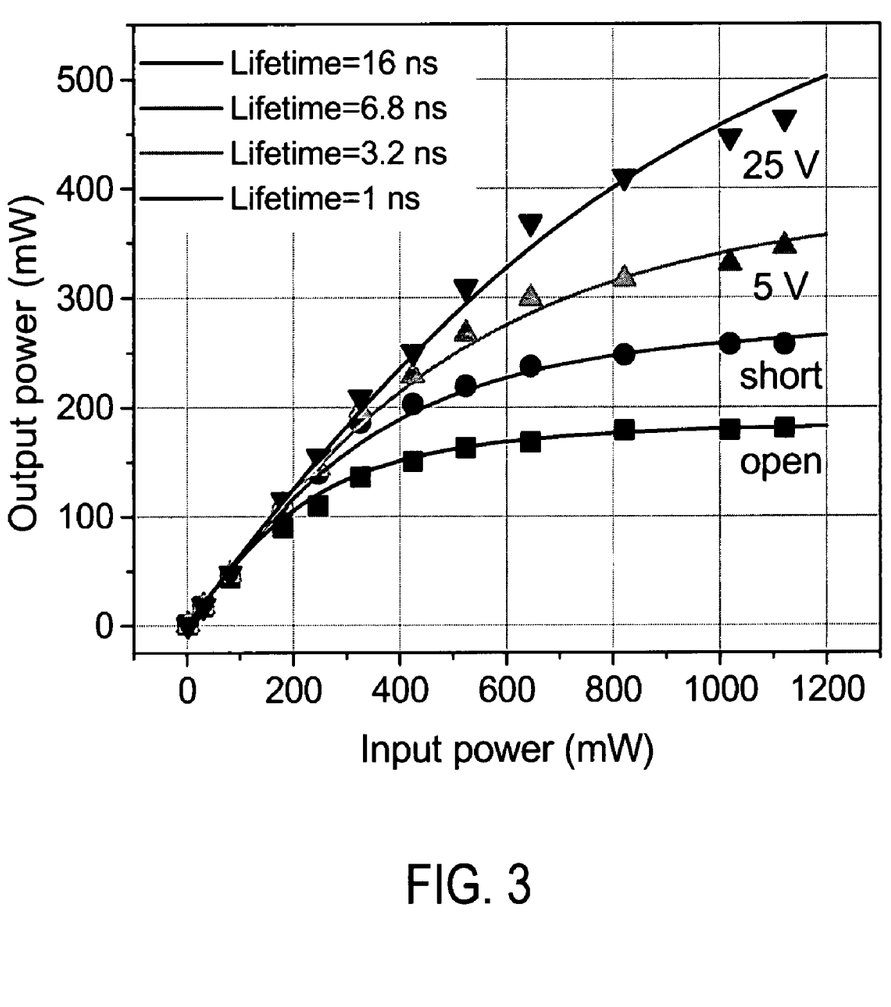
FIG. 3 is a diagram illustrating the relationship of output power with respect to input power for various reverse bias voltage values in an embodiment of a variable optical power limiter according to embodiments of the present invention.

In the embodiment shown in FIG. 2, P region 107 and N region 109 of the diode structure disposed in optical waveguide 103 are disposed at opposite lateral sides of the slab region in the optical waveguide 103, outside of the optical mode of optical beam 113. As shown in the embodiment of FIG. 3, the diode structure is a PIN diode structure, which includes P doped silicon in P region 107, intrinsic silicon in semiconductor material 105 and N doped silicon in N region 109. In the illustrated embodiment, the optical mode of optical beam 113 propagates through the intrinsic silicon in semiconductor material 105 of the PIN diode structure.

In the embodiment of FIG. 2, variable voltage source 115 is illustrated as being coupled between P region 107 and N region 109. Variable voltage source 115 is coupled to apply an adjustable voltage between P region 107 and N region 109 to reverse bias the diode structure in accordance with the teachings of the present invention. By reverse biasing the diode structure as shown, an electric field is created between the P region 107 and N region 109 to sweep free carriers 225, which are electrons and/or holes, from the optical waveguide 103. By sweeping out the free carriers 225, the free carrier lifetimes of the free carriers 225 can be controlled to control the clamping of the output power level of optical beam 113 in accordance with the teachings of the present invention.

To illustrate, FIG. 3 is a diagram illustrating the relationship of output power with respect to input power for various reverse bias voltage values in an embodiment of a variable optical power limiter according to embodiments of the present invention. In particular, FIG. 3 illustrates light transmission curves according to embodiments of the present invention. As shown, the output power level of optical beam 114 output from optical waveguide 103 depends at lower input power levels on the input power level of the optical beam 113. At low input power levels for optical beam 113, the silicon of semiconductor material 105 is transparent for infrared (IR) light because the band gap of silicon is greater than the photon energy of optical beam 113. Therefore, this optical power limiter 101 transmits substantially all of the IR light of output optical abeam 114 with very low loss. As can be observed in FIG. 3, the output power level at low input power levels depends linearly on the input power level.

However, as the input power level increases towards a high input power level, two-photon absorption process occurs in optical waveguide 103, in which an electron in the valance band can absorb two photons simultaneously and gain enough energy to make a transition to the conduction band and leaves a hole behind. These electron-hole pairs generated by the two-photon absorption process have a finite lifetime that depends on the material properties and the waveguide dimensions. As the input power level of optical beam 113 continuously increases, the density of the free electron hole pairs making up free carriers 225 can accumulate to a significant level that they start to absorb the photons of optical beam 113 in optical waveguide 103. Eventually the output power level of output optical beam 114 will be limited or clamped and will stop increasing with respect to the input power level, as illustrated in FIG. 3 in accordance with the teachings of the present invention. Therefore, an optical power limiter according to embodiments of the present invention functions as a self-actuating nonlinear optical device that transmits low-intensity light, but clamps high-intensity light in accordance with the teachings of the present invention.

As shown in the example of FIG. 3, the free carrier lifetime of free carriers is approximately 16 ns for an open circuit condition between P region 107 and N region 109, while the free carrier lifetime reduced to approximately 6.8 ns for a short circuit, 3.2 ns for a 5 volt reverse bias and 1 ns for a 25 volt reverse bias according to an embodiment of the present invention. With a free carrier lifetime of 16 ns, the output power level is clamped to, or starts to level off at, an output power level of approximately 150 mW, approximately 250 mW for a free carrier lifetime of 6.8 ns, approximately 350 mW for a free carrier lifetime of 3.2 ns and approximately 500 mW for a free carrier lifetime of 1 ns. It is appreciated of course that the power levels and free carrier lifetimes of these measurements are only examples and are provided for explanation purposes and that other values may be realized in accordance with the teachings of the present invention.

In one embodiment, the power limiting threshold, which is where the output power starts to level off, depends on the lifetime of the free carriers (electrons and holes) generated by the two-photon absorption process in the silicon of optical waveguide 103. By controlling the free carrier lifetime, the saturation level of the output power can be varied in accordance with the teachings of the present invention. Therefore, with the diode structure variably reverse biased as discussed above, the free carriers are swept out of optical waveguide 103 by the applied electric field between P region 107 and N region 109. Accordingly, the effective free carrier lifetime of free carriers 225 is reduced. The output power level can be adjusted by changing the reverse bias voltage applied to P region 107 and N region 109 with variable voltage source 115, which in turn alters the free carrier lifetime in accordance with the teachings of the present invention.

Figure 4:
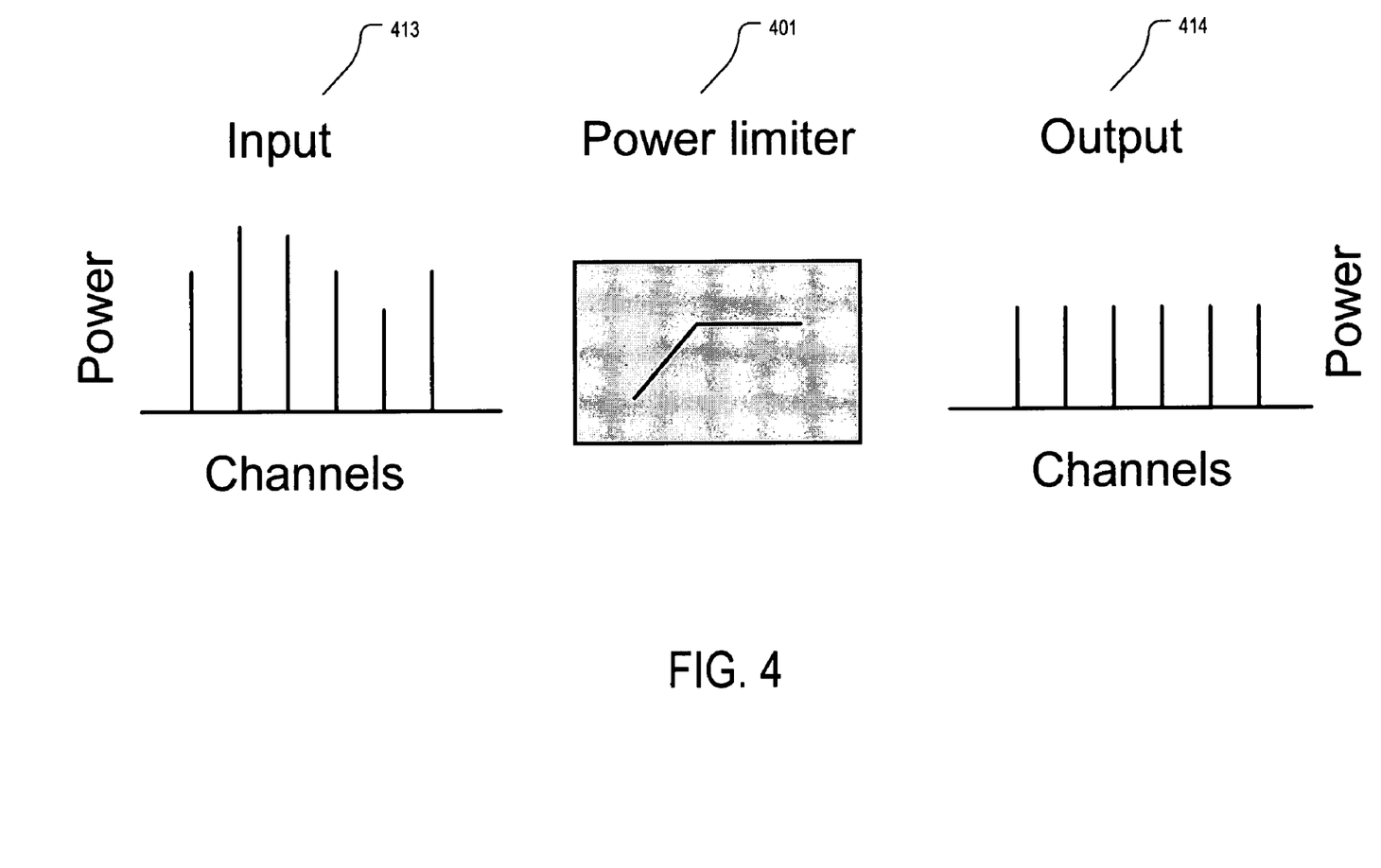
FIG. 4 is a diagram illustrating an embodiment of a variable optical power limiter utilized as an equalizer in an optical communications network having multiple channels in accordance with the teachings of the present invention.

FIG. 4 is a diagram illustrating an embodiment of a variable optical power limiter utilized as an optical power equalizer in an optical communications network having multiple channels in accordance with the teachings of the present invention. In the depicted example, a plurality of input optical beams or channels 413 have non-uniform or unequal optical power levels. An optical power limiter 401 according to embodiments of the present invention can be employed to equalize the power levels of the plurality of input optical beams as shown with the plurality of output optical beams or channels 414. In the illustrated example, the power limiter 414 is set to have clamp the output power level less than the lowest power level present in the plurality of input optical beams 413 to a level as shown. Therefore, the output optical power levels of the plurality of output optical beams are all equalized to the same clamped value as shown in accordance with the teachings of the present invention.

Figure 5:
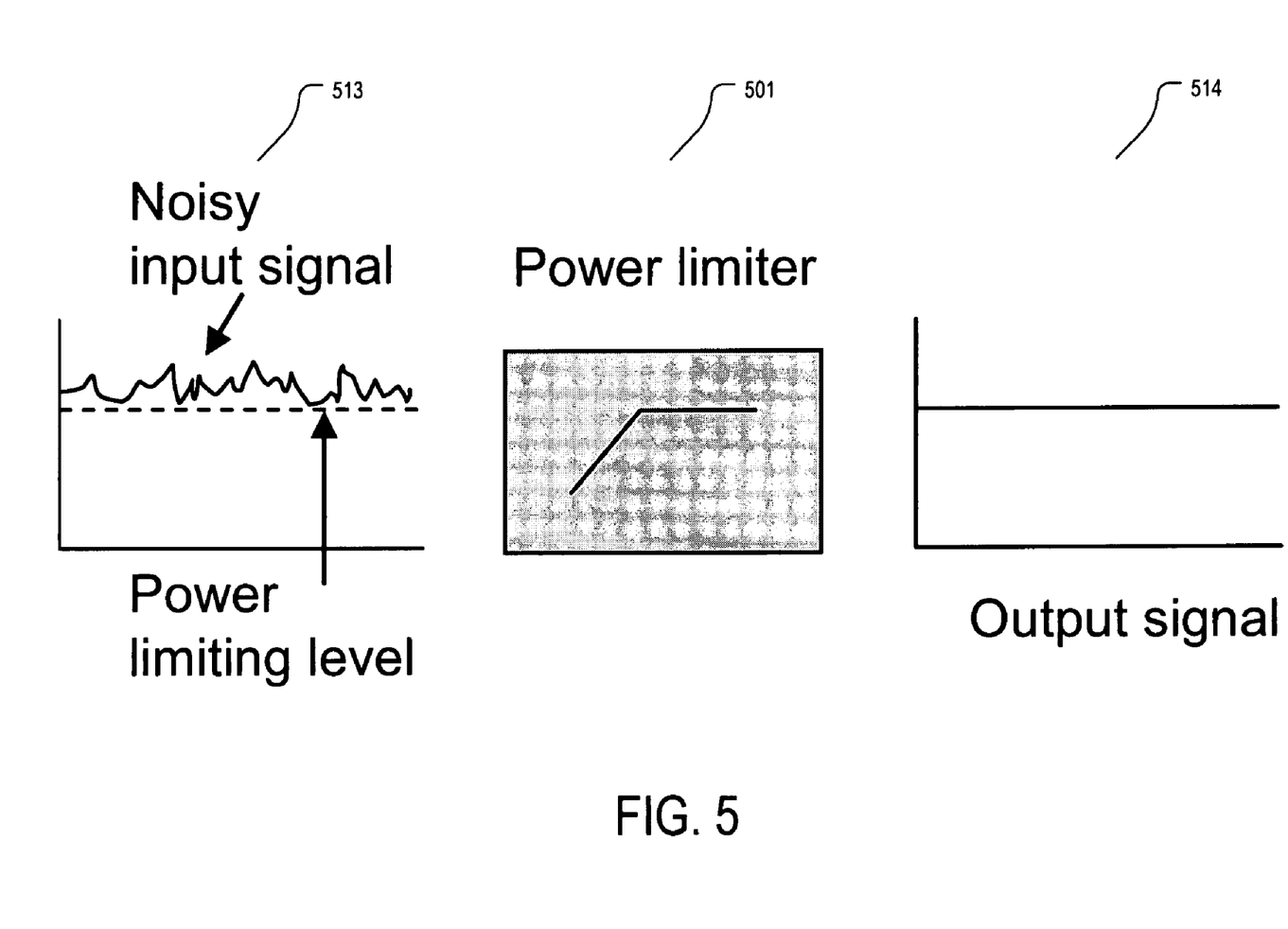
FIG. 5 is a diagram illustrating an embodiment of a variable optical power limiter utilized to substantially remove noise from a noisy input optical signal in accordance with the teachings of the present invention.

FIG. 5 is a diagram illustrating an embodiment of a variable optical power limiter utilized to substantially remove noise from a noisy input optical signal in accordance with the teachings of the present invention. In the depicted example, an input optical beam 513 is illustrate as being a noisy input signal. In order to remove the noise from the noisy input signal of input optical beam 513, the variable voltage source can be set to adjust the clamp output voltage of power limiter 501 as shown to result in a clean output signal 514 as illustrated in FIG. 5.

It is appreciated that the variable optical power limiting function provided according to embodiments of the present invention has other versatile applications in accordance with the teachings of the present invention and the examples provided are for explanation purposes. For example, other embodiments in accordance with the teachings of the present invention include eye protection applications, power sensitive instrument protection, equalization of optical signals, limiting power of high power optical amplifiers and/or other suitable applications in which the optical power of an optical beam is to be clamped or adjusted in accordance with the teachings of the present invention.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific wavelengths, dimensions, materials, times, voltages, power range values, etc., are provided for explanation purposes and that other values may also be employed in other embodiments in accordance with the teachings of the present invention.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
    an optical waveguide including a slab region and a rib region formed from a layer of substrate semiconductor material, wherein the rib region includes intrinsic silicon, an optical beam to be directed through the optical waveguide such that the optical beam propagates through the intrinsic silicon of the rib region, the optical beam to generate free carriers in the optical waveguide via two-photon absorption in response to an input power level of the optical beam; and
    a reversed-biased PIN diode structure disposed in the optical waveguide, the reverse-biased PIN diode structure including an electric field between a P region and an N region of the reverse-biased PIN diode structure to sweep out free carriers from the optical waveguide to control free carrier lifetimes of the free carriers in the optical waveguide to limit an output power of the optical beam to a clamped output power level in response to the electric field of the reverse biased diode structure such that substantially all of the optical beam propagates through the optical waveguide when the input power level of the optical beam is substantially less than the clamped output power level and such that the output power of the optical beam is clamped to the clamped output power level when the input power level is greater than the clamped output power level, wherein the intrinsic silicon of rib region is disposed directly on intrinsic silicon of the slab region without a layer of dielectric material intervening between the intrinsic silicon of the rib region and the intrinsic silicon of the slab region.

2. The apparatus of claim 1 further comprising a voltage source coupled to the P region and the N region of the reverse-biased diode PIN structure.

3. The apparatus of claim 2 wherein the voltage source is a variable voltage source to vary the clamped output power level.

4. The apparatus of claim 1 wherein the reverse-biased PIN diode structure comprises:
    the P region disposed on a lateral side of the optical waveguide; and
    the N region disposed on an opposite lateral side of the optical waveguide.

5. The apparatus of claim 1 wherein the optical waveguide comprises a silicon rib waveguide disposed in the semiconductor material.

6. The apparatus of claim 1 wherein the electric field between the P region and the N region of the reverse-biased PIN diode structure is coupled to sweep out the free carriers from the optical waveguide generated in response to the two-photon absorption occurring in the optical waveguide in response to the optical beam.

7. The apparatus of claim 1 wherein the reverse-biased PIN diode structure is coupled to be variably reversed biased.

8. A system, comprising:
    optical waveguide including a slab region and a rib region formed from a layer of substrate semiconductor material, wherein the rib region includes intrinsic silicon, an optical beam to be directed through the optical waveguide such that the optical beam propagates through the intrinsic silicon of the rib region, the optical beam to generate free carriers in the optical waveguide via two-photon absorption in response to an input power level of the optical beam;
    a reverse-biased PIN diode structure disposed in the optical waveguide, the reverse-biased PIN diode structure including an electric field between a P region and an N region of the reverse-biased diode structure to sweep out free carriers from the optical waveguide to control free carrier lifetimes of the free carriers in the optical waveguide to limit an output power of the optical beam to a clamped output power level in response to the electric field of the reverse biased PIN diode structure such that substantially all of the optical beam propagates through the optical waveguide when the input power level of the optical beam is substantially less than the clamped output power level and such that the output power of the optical beam is clamped to the clamped output power level when the input power level is greater than the clamped output power level, wherein the intrinsic silicon of rib region is disposed directly on intrinsic silicon of the slab region without a layer of dielectric material intervening between the intrinsic silicon of the rib region and the intrinsic silicon of the slab region;
    an optical fiber optically coupled to receive the optical beam from the optical waveguide; and
    an optical receiver optically coupled to receive the optical beam from the optical waveguide through the optical fiber.

9. The system of claim 8 further comprising a variable voltage source coupled to the reverse-biased diode structure to control a reverse bias of the reverse-biased PIN diode structure to vary the clamped output power level.

10. The system of claim 8 wherein the optical beam is one of a plurality of optical beams and the optical receiver is one of a plurality of optical receivers, each of which is optically coupled to receive a respective one of the plurality of optical beams, wherein each of the plurality of optical beams received by the optical receivers has a power level equalized to the clamped output power level.

11. The system of claim 8 wherein each of the plurality of optical beams corresponds to a unique channel of an optical communication system.

12. An optical power limiter, comprising:
- a layer of substrate semiconductor material;
- an optical waveguide including a slab region and a rib region formed from the layer of substrate semiconductor material, wherein the rib region and the slab region each include intrinsic silicon, wherein the optical waveguide is configured such that an optical beam is to be directed through the intrinsic silicon of the rib region and through the intrinsic silicon of the slab region to generate free carriers in the optical waveguide via two-photon absorption in response to an input power level of the optical beam; and
- a PIN diode structure coupled to be reverse-biased and disposed in the optical waveguide, the PIN diode structure including a P region, an N region, and the intrinsic silicon of the slab region, wherein the P region and the N region are disposed at opposite lateral sides of the slab region and on opposite lateral sides of the intrinsic silicon of the slab region, wherein an electric field is to be created between a P region and an N region to sweep out free carriers from the optical waveguide to control free carrier lifetimes of the free carriers in the optical waveguide to limit an output power of the optical beam to a clamped output power level in response to the electric field of the PIN diode structure when reverse-biased, wherein the intrinsic silicon of rib region is disposed directly on the intrinsic silicon of the slab region without a layer of dielectric material intervening between the intrinsic silicon of the rib region and the intrinsic silicon of the slab region.

13. The optical power limiter of claim 12, wherein the optical waveguide is configured such that an intensity distribution of an optical mode of the optical beam includes more of the optical beam propagating through the intrinsic silicon of the rib region than propagates through the intrinsic silicon of the slab region.

* * * * *